United States Patent
Yang et al.

(10) Patent No.: US 11,934,566 B2
(45) Date of Patent: Mar. 19, 2024

(54) VOLTAGE ATTACK DETECTION CIRCUIT AND CHIP

(71) Applicant: SHENZHEN GOODIX TECHNOLOGY CO., LTD., Guangdong (CN)

(72) Inventors: Jiang Yang, Guangdong (CN); Jianfeng Xue, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 97 days.

(21) Appl. No.: 17/483,040

(22) Filed: Sep. 23, 2021

(65) Prior Publication Data

US 2022/0012370 A1 Jan. 13, 2022

Related U.S. Application Data

(63) Continuation of application No. PCT/CN2020/078445, filed on Mar. 9, 2020.

(51) Int. Cl.
*G06F 21/75* (2013.01)
*H03K 19/20* (2006.01)

(52) U.S. Cl.
CPC ........... *G06F 21/755* (2017.08); *H03K 19/20* (2013.01)

(58) Field of Classification Search
None
See application file for complete search history.

(56) References Cited

U.S. PATENT DOCUMENTS 4,956,563 A * 9/1990 Schornack .............. H02J 9/062
307/66
5,055,703 A * 10/1991 Schornack .............. H02J 9/062
307/64

(Continued)

FOREIGN PATENT DOCUMENTS

CN 101561460 A 10/2009
CN 101566645 A 10/2009

(Continued)

OTHER PUBLICATIONS

Wojslaw, C., "Digitally Programmable Potentiometer (DPP) Basics", Jul. 31, 2019, pp. 1-7, web.archive.org/web/20190731031259/www.nutsvolts.com/magazine/article/digitally-programmable-potentiometer-dpp-basics.

(Continued)

*Primary Examiner* — Trang T Doan
(74) *Attorney, Agent, or Firm* — SCULLY, SCOTT, MURPHY & PRESSER, PC (57) ABSTRACT

A voltage attack detection circuit of a chip includes: a first programmable resistor and a second programmable resistor, a first terminal of the first programmable resistor is connected to a supply voltage, a second terminal of the first programmable resistor is connected to a ground voltage through the second programmable resistor, the first terminal outputs a first voltage, the second terminal outputs a second voltage; a voltage detection circuit, receives the first voltage and a first reference voltage and output a first signal, where the first signal is configured to indicate whether the first voltage is greater than or equal to the first reference voltage, the voltage detection circuit is further configured to receive the second voltage and a second reference voltage and output a second signal, and the second signal is configured (Continued)

to indicate whether the second voltage is less than or equal to the second reference voltage.

9 Claims, 2 Drawing Sheets

(56) References Cited

U.S. PATENT DOCUMENTS

| | | | | |
|---|---|---|---|---|
| 5,485,140 | A * | 1/1996 | Bussin | B60Q 9/003 |
| | | | | 200/61.42 |
| 6,605,929 | B2 | 8/2003 | Tsukagoshi et al. | |
| 6,751,079 | B2 | 6/2004 | Bretschneider | |
| 10,063,159 | B1 * | 8/2018 | Kong | H03K 5/1252 |
| 2002/0105308 | A1 | 8/2002 | Tsukagoshi et al. | |
| 2002/0186038 | A1 | 12/2002 | Bretschneider | |
| 2007/0146017 | A1 * | 6/2007 | Sadayuki | G05F 1/575 |
| | | | | 327/77 |
| 2009/0039820 | A1 * | 2/2009 | Milano | H02P 29/60 |
| | | | | 318/590 |
| 2014/0151558 | A1 * | 6/2014 | Bortot | H05B 47/115 |
| | | | | 250/338.1 |
| 2014/0313608 | A1 * | 10/2014 | Nakabayashi | H02M 3/1584 |
| | | | | 360/39 |
| 2016/0336932 | A1 | 11/2016 | Huang et al. | |
| 2018/0316180 | A1 * | 11/2018 | Batenburg | H02H 1/0007 |
| 2020/0182916 | A1 * | 6/2020 | Kim | G01R 19/16519 |

FOREIGN PATENT DOCUMENTS

| | | |
|---|---|---|
| CN | 101943728 A | 1/2011 |
| CN | 103034804 A | 4/2013 |
| CN | 103675421 A | 3/2014 |
| CN | 105510688 A | 4/2016 |
| CN | 105629028 A | 6/2016 |

OTHER PUBLICATIONS

International Search Report dated Dec. 8, 2020 issued in PCT/CN2020/078445.

Goikoetxea Yanci et al., "Characterization of a Voltage Glitch Attack Detector for Secure Devices", Symposium on Bio-inspired Learning and Intelligent Systems for Security, BLISS 2009, Edingburgh, United Kingdom, Aug. 20-21, 2009. IEEE, 2009. pp. 91-96.

Duan Xiao-Yi et al., "Advanced Evolution of Power Glitch Attack and Resistance Techniques", Computer Science (Oct. 1, 2011), vol. 38, No. 10A, pp. 428-431.

* cited by examiner

VOLTAGE ATTACK DETECTION CIRCUIT AND CHIP

CROSS REFERENCE TO RELATED APPLICATIONS

The present application is a continuation of international application No. PCT/CN2020/078445, filed on Mar. 9, 2020, which is hereby incorporated by reference in its entirety.

TECHNICAL FIELD

An embodiment of the present application relates to the field of electronics, and in particular, to a voltage attack detection circuit and a chip.

BACKGROUND

With the widespread popularity of mobile payments and transactions, electronic devices are increasingly used to store, process, and transmit data containing key information. For example, a security chip may be used to implement functions such as user identification and key data storage, and it is widely applied in the financial field. As a foundation of security hardware, the security chip plays an essential role in information security. In recent years, more and more chip-level attack methods and instances have been disclosed, and accordingly, higher and higher requirements are put forward for chip-level security.

There are many ways of chip-level attacks, among which error injection attack is the most effective. The purpose of the error injection attack is to force the chip to perform an abnormal operation, thereby causing security information in the chip to be exposed. At this point, an attacker can easily obtain confidential data in the security chip by using fault analysis technology. There are many ways of the error injection attacks, such as voltage attack, temperature attack, laser attack, electromagnetic attack and the like.

For voltage attacks, by changing a supply voltage of a power domain of the chip, a circuit inside the chip is made to work abnormally, thereby causing a trigger to enter an error state, causing a processor to skip or perform a wrong operation, so that the security information in the chip is exposed.

Therefore, it is very urgent to provide a complete and reliable protection solution against voltage attacks.

SUMMARY

A voltage attack detection circuit and a chip are provided, which can detect whether the chip is under voltage attack.

In a first aspect, a voltage attack detection circuit is provided, including:
a first programmable resistor and a second programmable resistor, where a first terminal of the first programmable resistor is connected to a supply voltage, a second terminal of the first programmable resistor is connected to a ground voltage through the second programmable resistor, the first terminal is configured to output a first voltage, and the second terminal is configured to output a second voltage;
a voltage detection circuit, where the voltage detection circuit is configured to receive the first voltage and a first reference voltage and output a first signal, the first signal is configured to indicate whether the first voltage is greater than or equal to the first reference voltage, the voltage detection circuit is further configured to receive the second voltage and a second reference voltage and output a second signal, the second signal is configured to indicate whether the second voltage is less than or equal to the second reference voltage, and the first reference voltage is greater than the second reference voltage.

The supply voltage is divided by the first programmable resistor and the second programmable resistor, to form the first voltage and the second voltage. The first voltage and the second voltage are compared with the first reference voltage and the second reference voltage respectively, to form the first signal and the second signal. Accordingly, the first signal may be configured to indicate whether the first voltage has a high voltage abnormality, and the second signal may be configured to indicate whether the second voltage has a low voltage abnormality, which is equivalent to that the first signal and the second signal may indicate whether the supply voltage has a high voltage abnormality or low voltage abnormality, respectively. That is, the first signal and the second signal may be configured to indicate whether the supply voltage is under attack, so as to remind a user to pay attention to safety protection or take security measures when the supply voltage is under attack.

In addition, through the first programmable resistor and the second programmable resistor, the first voltage and/or the second voltage can be configured, so that the voltage detection threshold deviation caused by the process may be compensated, so as to improve yield.

In some possible implementation manners, the first reference voltage is less than or equal to a voltage value of the first voltage when the supply voltage is a maximum working voltage of a bandgap voltage reference, and the second reference voltage is greater than or equal to a voltage value of the second voltage when the supply voltage is a minimum working voltage of the bandgap voltage reference.

In other words, the first reference voltage is less than or equal to a voltage value of the first voltage after being divided by the first programmable resistor and the second programmable resistor when the supply voltage is the maximum working voltage of the bandgap voltage reference; and the second reference voltage is greater than or equal to a voltage value of the second voltage after being divided by the first programmable resistor and the second programmable resistor when the supply voltage is the minimum working voltage of the bandgap voltage reference.

When the circuit is working normally, the first reference voltage is constructed to be less than or equal to the voltage value of the first voltage when the supply voltage is the maximum working voltage of the bandgap voltage reference; and the second reference voltage is constructed to be greater than or equal to the voltage value of the second voltage value when the supply voltage is the minimum working voltage of the bandgap voltage reference, the probability of false alarm may be reduced as much as possible, so as to improve user experience.

In some possible implementation manners, the voltage detection circuit includes:
a first hysteresis comparator and a second hysteresis comparator;
where a positive input terminal of the first hysteresis comparator is connected to the first terminal to receive the first voltage, a negative input terminal of the first hysteresis comparator is connected to the first reference voltage, an output terminal of the first hysteresis comparator is configured to output the first signal, a positive input of the second hysteresis comparator is connected to the second terminal to receive the second voltage, a negative input terminal of the second hysteresis comparator is connected to the second reference voltage, and an output terminal of the second hysteresis comparator is configured to output the second signal.

Through the first hysteresis comparator and the second hysteresis comparator, the anti-interference ability of the voltage detection circuit can be effectively improved, and accordingly, the reliability of the voltage attack detection circuit is improved.

In addition, when the first hysteresis comparator and the second hysteresis comparator are working at a high speed, the sensitivity of the voltage attack detection circuit can be improved.

In some possible implementation manners, the first signal is configured to indicate whether the first voltage in a rising phase is greater than or equal to the first reference voltage, the first signal is further configured to indicate whether the first voltage in a falling phase is less than or equal to a first threshold, and a difference between the first reference voltage and the first threshold is an amount of hysteresis of the first hysteresis comparator.

In some possible implementation manners, the second signal is configured to indicate whether the second voltage in a falling phase is less than or equal to the second reference voltage, the second voltage is further configured to indicate whether the second voltage in a rising phase is greater than or equal to a second threshold, and a difference between the second threshold and the second reference voltage is an amount of hysteresis of the second hysteresis comparator.

In some possible implementation manners, the voltage attack detection circuit further includes:
a first AND gate and a second AND gate;
where the first AND gate is configured to receive the first signal and a first indication signal and output a third signal, the second AND gate is configured to receive the second signal and a second indication signal and output a fourth signal, the first indication signal is configured to indicate whether the first reference voltage is abnormal, and the second indication signal is configured to indicate whether the second reference voltage is abnormal.

Through the first AND gate and the second AND gate, inaccurate indications of the first signal and the second signal, caused by the abnormality of the first reference voltage or the second reference voltage, can be avoided. In other words, through the first AND gate and the second AND gate, false alarm caused by the abnormality of the reference voltage can be avoided, so as to improve the accuracy of voltage attack alarm.

In some possible implementation manners, the voltage attack detection circuit further includes:
a reference voltage generation circuit and a reference voltage detection circuit;
where the reference voltage generation circuit is configured to generate the first reference voltage and the second reference voltage, the reference voltage detection circuit is connected to the reference voltage generation circuit, the reference voltage detection circuit is configured to receive the first reference voltage and output the first indication signal, and the reference voltage detection circuit is further configured to receive the second reference voltage and output the second indication signal.

In some possible implementation manners, the voltage attack detection circuit further includes:
a deglitch circuit;

where the reference voltage generation circuit is connected to the first AND gate and the second AND gate respectively through the deglitch circuit, and the deglitch circuit is configured to reset an indication signal, configured to indicate that a reference voltage is abnormal, with a duration less than or equal to a preset threshold to an indication signal configured to indicate that a reference voltage is not abnormal.

In the case of a glitch in the reference voltage, the deglitch circuit can ensure the accuracy of the first indication signal and the second indication signal, and accordingly, can ensure the accuracy of the third signal and the fourth signal. In other words, the deglitch circuit can correctly indicate whether the supply voltage is under attack when there is a glitch in the reference voltage, so as to remind the user to pay attention to safety protection or take security measures when the supply voltage is under attack.

The voltage attack detection circuit further includes:
a first OR gate and a second OR gate;
where the first OR gate is configured to receive the first signal and a first test signal and output a fifth signal, the second OR gate is configured to receive the second signal and the second test signal and output a sixth signal, the first test signal is configured to indicate that the first voltage is greater than or equal to the first reference voltage, and the second test signal is configured to indicate that the second voltage is less than or equal to the second reference voltage.

Through the first test signal and the second test signal, the fifth signal may be forced to indicate that the first voltage is greater than or equal to the reference voltage, or the sixth signal may be forced to indicate that the second voltage is less than or equal to the reference voltage, so as to facilitate a designer to detect the voltage attack detection circuit. In other words, through the first OR gate and the second OR gate, the fifth signal and the sixth signal may be forced to enter an alarming state, respectively.

In some possible implementation manners, the voltage attack detection circuit further includes:
a first resistor;
where the first programmable resistor is connected to the supply voltage through the first resistor.

In a second aspect, a chip is provided, including:
a power management unit; and
the voltage attack detection circuit according to the first aspect or any possible implementation manners of the first aspect;
where the power management unit is connected to the voltage attack detection circuit, and the voltage attack detection circuit is configured to detect whether a supply voltage of the power management unit is under voltage attack.

DESCRIPTION OF EMBODIMENTS

Figure 1:
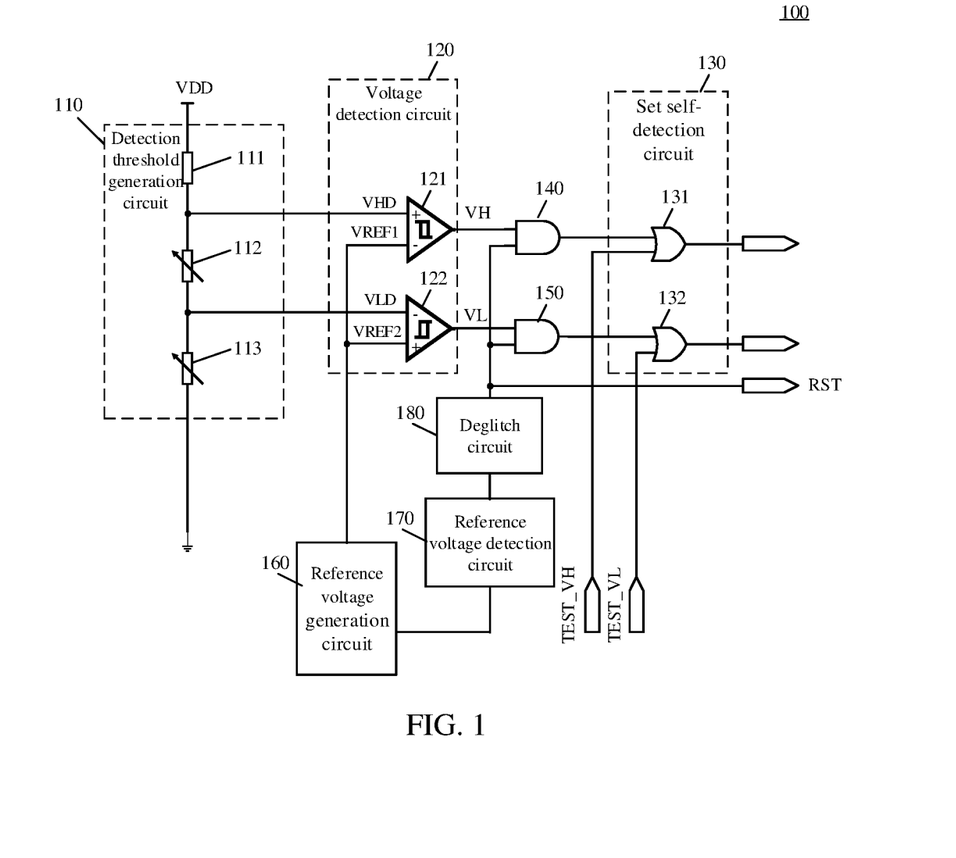
FIG. 1 is a schematic structure diagram of a voltage attack detection circuit of an embodiment of the present application.
Figure 2:
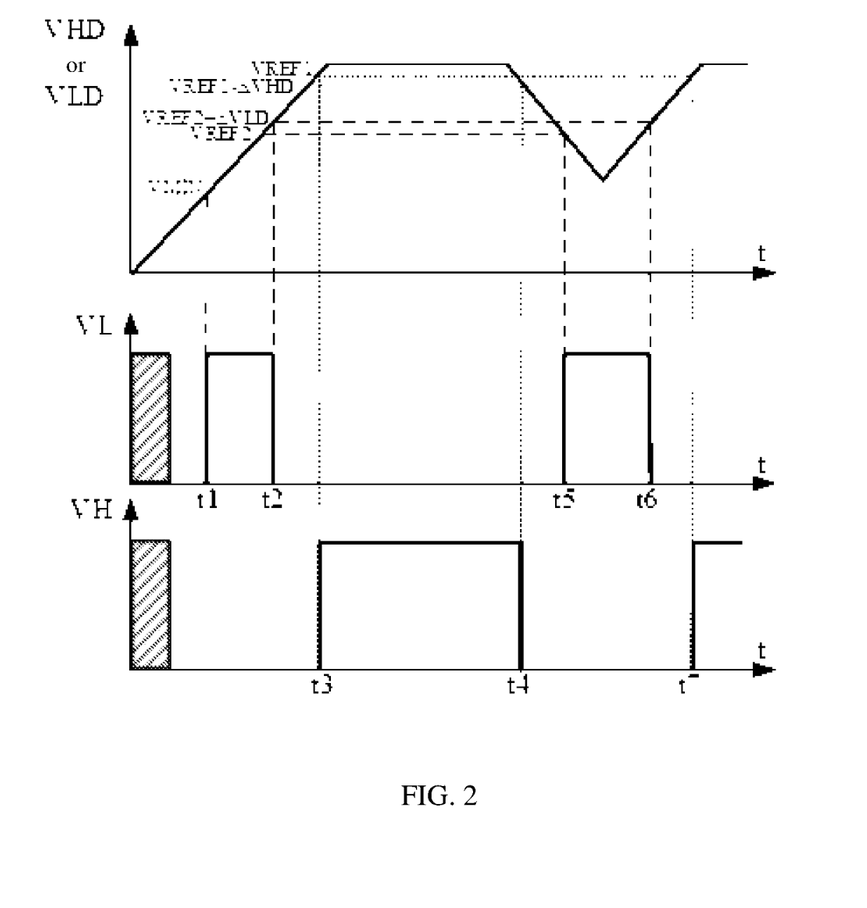
FIG. 2 is a working sequence diagram of a voltage attack detection circuit shown in FIG. 1.

FIG. 1 is a schematic structure diagram of a voltage attack detection circuit 100 of an embodiment of the present application. FIG. 2 is a working sequence diagram of a voltage attack detection circuit shown in FIG. 1. The following describes technical solutions of embodiments of the present application with reference to accompanying drawings.

As shown in FIG. 1, the voltage attack detection circuit 100 may include a first programmable resistor 112, a second programmable resistor 113 and a voltage detection circuit 120. A first terminal of the first programmable resistor 112 is connected to a supply voltage VDD, a second terminal of the first programmable resistor 112 is connected to a ground voltage through the second programmable resistor 113, the first terminal is configured to output a first voltage, and the second terminal is configured to output a second voltage.

Here, the voltage detection circuit 120 is configured to receive the first voltage and a first reference voltage VREF and output a first signal, the first signal is configured to indicate whether the first voltage is greater than or equal to the first reference voltage. The voltage detection circuit 120 is further configured to receive the second voltage and a second reference voltage and output a second signal, the second signal is configured to indicate whether the second voltage is less than or equal to the second reference voltage, and the first reference voltage is greater than the second reference voltage.

In other words, the first programmable resistor 112 and the second programmable resistor 113 may be configured to form a detection threshold generation circuit 110, and the detection threshold generation circuit 110 is configured to generate the first voltage and the second voltage.

As shown in FIG. 1, the first voltage may also be referred to as a high voltage detection threshold (Voltage high threshold detection, VHD), and the second voltage may also be referred to as a low voltage detection threshold (Voltage low threshold detection, VLD). Similarly, the first signal may also be referred to as a high voltage (Voltage high, VH) alarm signal, and the second signal may also be referred to as a low voltage (Voltage low, VL) alarm signal.

The supply voltage is divided by the first programmable resistor 112 and the second programmable resistor 113, to form the first voltage and the second voltage. The first voltage and the second voltage are compared with the first reference voltage and the second reference voltage respectively, to form the first signal and the second signal. Accordingly, the first signal may be configured to indicate whether the first voltage has a high voltage abnormality, and the second signal can be configured to indicate whether the second voltage has a low voltage abnormality, which is equivalent to that the first signal and the second signal may indicate whether the supply voltage has a high voltage abnormality and low voltage abnormality, respectively.

For example, when the first voltage is greater than or equal to the first reference voltage, it is indicated that the supply voltage has the high voltage abnormality, and when the second voltage is less than the second reference voltage, it is indicated that the supply voltage has the low voltage abnormality. Accordingly, the presence of high voltage abnormality or low voltage abnormality of the supply voltage indicates that the supply voltage has been attacked. When the supply voltage is under attack, the first signal and the second signal can remind the user to pay attention to safety protection and take security measures.

In addition, through the first programmable resistor 112 and the second programmable resistor 113, the first voltage and/or the second voltage can be dynamically configured, so that the voltage detection threshold (that is, the first reference voltage and the second reference voltage) deviation caused by the process may be compensated, so as to improve yield.

In some embodiments of the present application, the first reference voltage is less than or equal to a voltage value of the first voltage when the supply voltage is a maximum working voltage of a bandgap voltage reference, and the first signal is configured to indicate that the first voltage has a high voltage abnormality. The second reference voltage is greater than or equal to a voltage value of the second voltage when the supply voltage is a minimum working voltage of a bandgap voltage reference, and the second signal is configured to indicate that the second voltage has a low voltage abnormality.

In other words, when the supply voltage is equal to the maximum working voltage of the bandgap voltage reference, the first reference voltage is less than or equal to the first voltage, and the first signal is configured to indicate that the supply voltage has the high voltage abnormality. When the supply voltage is equal to the minimum working voltage of the bandgap voltage reference, the second reference voltage is greater than or equal to the second voltage, and the second signal is configured to indicate that the supply voltage has the low voltage abnormality.

Here, the bandgap voltage reference may also be referred to as a bandgap voltage reference circuit, and the bandgap voltage reference may be configured to convert the supply voltage into working voltages of some or all of the devices in the voltage attack detection circuit 100. In other words, the supply voltage may be used as a working voltage of the bandgap voltage reference, so that the bandgap voltage reference can output the working voltages for some or all of the devices in the voltage attack detection circuit 100 based on the supply voltage. The working voltage of the bandgap voltage reference may be a range value. The working voltage of the bandgap voltage reference may also be a preset value. The magnitude of the working voltage of the bandgap voltage reference depends on the magnitude of the supply voltage. For example, the supply voltage may be directly used as the working voltage of the bandgap voltage reference.

When determining whether the supply voltage has the high voltage abnormality, if the working voltage of the bandgap voltage reference is at the maximum working voltage, since the working voltage of the bandgap voltage reference is provided by the supply voltage, after the supply voltage is divided through the first programmable resistor 112 and the second programmable resistor 113, the first voltage can reach a maximum value. The first signal formed by comparing the maximum value of the first voltage with the first reference voltage is configured to indicate whether the supply voltage is at a high voltage abnormality state. Thus, the accuracy of the first signal can be increased.

Similarly, when determining whether the supply voltage has the low voltage abnormality, if the working voltage of the bandgap voltage reference is at the minimum working voltage, since the working voltage of the bandgap voltage reference is provided by the supply voltage, after the supply voltage is divided through the first programmable resistor 112 and the second programmable resistor 113, the second voltage can reach a minimum value. The second signal formed by comparing the minimum value of the second voltage with the second reference voltage is configured to indicate whether the supply voltage is at a low voltage abnormality state. Thus, the accuracy of the second signal can be increased.

Specifically, when the supply voltage is the maximum working voltage of the bandgap voltage reference, if the first reference voltage is less than or equal to the voltage value of the first voltage after being divided by the first programmable resistor 112 and the second programmable resistor 113, and the first signal is configured to indicate that the supply voltage has the high voltage abnormality. When the supply voltage is the minimum working voltage of the bandgap voltage reference, if the second reference voltage is greater than or equal to the voltage value of the second voltage after being divided by the first programmable resistor 112 and the second programmable resistor 113, and the second signal is configured to indicate that the supply voltage has the low voltage abnormality.

In other words, the first signal may be configured to indicate whether the first voltage is greater than or equal to a maximum value of a preset voltage range, and the second signal may be configured to indicate whether the second voltage is less than or equal to a minimum value of the preset voltage range. For example, the preset voltage range is a working voltage range of the bandgap voltage reference. For example, the preset voltage range may include a plurality voltage values. The first signal is configured to indicate whether the first voltage is greater than or equal to a maximum value of the plurality voltage values, and the second signal is configured to indicate whether the second voltage is less than or equal to a minimum value of the plurality of voltage values.

In conclusion, when the circuit is working normally, the first reference voltage is constructed to be less than or equal to the voltage value of the first voltage when the supply voltage is the maximum working voltage of the bandgap voltage reference; and the second reference voltage is constructed to be greater than or equal to the voltage value of the second voltage when the supply voltage is the minimum working voltage of the bandgap voltage reference, the accuracy of the first signal and the second signal can be improved and the probability of false alarm can be reduced as much as possible, so as to improve user experience.

As shown in FIG. 1, in some embodiments of the present application, the voltage detection circuit includes a first hysteresis comparator 121 and a second hysteresis comparator 122.

Here, a positive input terminal of the first hysteresis comparator 121 is connected to the first terminal to receive the first voltage, a negative input terminal of the first hysteresis comparator 121 is connected to the first reference voltage, an output terminal of the first hysteresis comparator 121 is configured to output the first signal, a positive input of the second hysteresis comparator 122 is connected to the second terminal to receive the second voltage, a negative input terminal of the second hysteresis comparator 122 is connected to the second reference voltage, and an output terminal of the second hysteresis comparator 122 is configured to output the second signal.

In other words, when the reference voltage is normal, when the supply voltage VDD rises such that the first voltage is greater than or equal to the first reference voltage (that is, exceeds the detection threshold of the first hysteresis comparator 121), the first hysteresis comparator 121 will output a high voltage alarm signal with a level of 1, to indicate that the supply voltage VDD has a high voltage abnormality. If the supply voltage VDD drops such that the first voltage drops below a difference between the first reference voltage and an amount of hysteresis AVHD of the first hysteresis comparator, the high voltage alarm signal can be cleared. When the supply voltage VDD drops such that the second voltage is less than or equal to the second reference voltage (that is, exceeds the detection threshold of the second hysteresis comparator 122), the second hysteresis comparator 122 will output a low voltage alarm with a level of 1, to indicate that the supply voltage VDD has a low voltage abnormality. If the supply voltage VDD rises such that the second voltage rises greater than a sum of the second reference voltage and an amount of hysteresis AVLD of the second hysteresis comparator 122, the low voltage alarm signal can be cleared.

The configuration of AVHD is to prevent the fluctuation of the first voltage from causing the circuit to frequently send out and clear the alarm signal, and to enhance the reliability and anti-interference ability of the circuit. In the meantime, after the high voltage alarm is sent out again, the high voltage alarm is cleared when the first voltage is dropped to a voltage value lower than the preset first reference voltage over AVHD. Thus, the security of the chip can be improved. Similar to AVHD, the configuration of AVLD is to prevent the fluctuation of the second voltage from causing the circuit to frequently send out and clear the alarm signal, and to enhance the reliability and anti-interference ability of the circuit. In the meantime, the voltage low alarm is cleared when the second voltage is increased to a voltage value higher than the preset second reference voltage over AVHD. Thus, the security of the chip can be improved.

In other words, through the first hysteresis comparator 121 and the second hysteresis comparator 122, the anti-interference ability of the voltage detection circuit can be effectively improved, and accordingly, the reliability of the voltage attack detection circuit 100 is improved.

In addition, when the first hysteresis comparator 121 and the second hysteresis comparator 122 are working at a high speed, the sensitivity of the voltage attack detection circuit 100 can be improved.

Of course, in other alternative embodiments, a single-threshold comparator may also be configured to replace the first hysteresis comparator 121 or the second hysteresis comparator 122.

It should be noted that the hysteresis comparator is equivalent to introduce a positive feedback circuit in the circuit, which can prevent the output voltage (that is, the first signal or the second signal) from jittering. Here, the hysteresis comparator has two threshold voltages, and a difference between the two threshold voltages can be an amount of hysteresis of the hysteresis comparator.

In some embodiments of the present application, the first signal is configured to indicate whether the first voltage in a rising phase is greater than or equal to the first reference voltage, the first signal is further configured to indicate whether the first voltage in a falling phase is less than or equal to a first threshold, and a difference between the first reference voltage and the first threshold is an amount of hysteresis AVHD of the first hysteresis comparator 121.

In other words, as shown in FIG. 2, when the first voltage increases from small to great, it corresponds to a great threshold voltage (that is, a maximum value of the reference voltage VREF1), and when the first voltage decreases from great to small, it corresponds to a small threshold voltage (that is, a difference between the maximum value VREF1 of the reference voltage and the amount of hysteresis AVHD, that is, the first threshold).

In some embodiments of the present application, the second signal is configured to indicate whether the second voltage in a falling phase is less than or equal to the reference voltage, the second voltage is further configured to indicate whether the second voltage in a rising phase is greater than or equal to a second threshold, and a difference between the second threshold and the reference voltage is an amount of hysteresis of the second hysteresis comparator 122.

In other words, as shown in FIG. 2, when the second voltage increases from small to great, it corresponds to a great threshold voltage (that is, a sum of a minimum value VREF2 of the reference voltage and an amount of hysteresis AVLD, that is, the second threshold), and when the second voltage decreases from great to small, it corresponds to a small threshold voltage (that is, the minimum value of the reference voltage VREF2).

The working principle of the voltage attack detection circuit shown in FIG. 1 will be described below with reference to FIG. 2.

As shown in FIG. 2, before time t1, the supply voltage VDD starts to rise from 0. When the supply voltage VDD rises and exceeds a minimum working voltage VMIN of the circuit at the time t1, the circuit starts to work normally. However, since the second voltage at this time is still lower than the second reference voltage VREF2, the low voltage alarm signal (i.e., the second signal) VL changes from 0 to 1, to indicate that the supply voltage VDD has the low voltage abnormality. The supply voltage VDD continues to rise, and when the second voltage exceeds VREF2+AVLD at time t2, the low voltage alarm signal VL changes from 1 to 0, to indicate that the supply voltage VDD does not have the low voltage abnormality. The supply voltage VDD continues to rise, and when the first voltage exceeds VREF1 at time t3, the high voltage alarm signal VH changes from 0 to 1, to indicate that the supply voltage VDD has the high voltage abnormality. The supply voltage VDD starts to drop, and when the first voltage is lower than VREF1-AVHD at time t4, the high voltage alarm signal VH changes from 1 to 0, to indicate that the supply voltage VDD does not have the high voltage abnormality. The supply voltage VDD continues to drop, and when the second voltage is lower than VREF2 at time t5, the low voltage alarm signal VL changes from 0 to 1, to indicate that the supply voltage VDD has the low voltage abnormality. If the second voltage starts to rise when it is not lower than VMIN, that is, the supply voltage VDD continues to rise, and when the second voltage exceeds VREF2+AVLD at time t6, the low voltage alarm signal VL changes from 1 to 0, to indicate the supply voltage VDD does not have the low voltage abnormality. The supply voltage VDD continues to rise, and when the first voltage exceeds VREF1 at time t7, the high voltage alarm signal VH changes from 0 to 1, to indicate that the supply voltage VDD has the high voltage abnormality.

As shown in FIG. 1, in some embodiments of the present application, the voltage attack detection circuit further includes a first AND gate 140 and a second AND gate 150.

Here, the first AND gate 140 is configured to receive the first signal and a first indication signal and output a third signal, the second AND gate 150 is configured to receive the second signal and a second indication signal and output a fourth signal, the first indication signal is configured to indicate whether the first reference voltage is abnormal, and the second indication signal is configured to indicate whether the second reference voltage is abnormal.

It should be noted that the AND gate (AND gate) is also referred to as an "AND" circuit, a logic "product", and a logic "AND" circuit, which is a basic logic gate circuit that performs an "AND" operation. The AND gate may have a plurality of input terminals and one output terminal. When all signals received by the input terminals are at high level (logic "1"), an output signal is at high level (logic "1"), otherwise the output signal is at low level (logic "0"). In other words, when the first signal and the first indication signal are both at high level (logic "1"), the third signal is at high level (logic "1"). Similarly, when the second signal and the second indication signal are both at high level (logic "1"), the fourth signal is at high level (logic "1").

Through the first AND gate 140 and the second AND gate 150, inaccurate indications of the first signal and the second signal, caused by the abnormality of the first reference voltage or the second reference voltage can be avoided. In other words, through the first AND gate 140 and the second AND gate 150, false alarm caused by the abnormality in the reference voltage can be avoided, so as to improve the accuracy of voltage attack alarm.

As shown in FIG. 1, in some embodiments of the present application, the voltage attack detection circuit further includes a reference voltage generation circuit 160 and a reference voltage detection circuit 170.

Here, the reference voltage generation circuit 160 is configured to generate the first reference voltage and the second reference voltage, the reference voltage detection circuit 170 is connected to the reference voltage generation circuit 160, the reference voltage detection circuit 170 is configured to receive the first reference voltage and output the first indication signal. The reference voltage detection circuit 170 is further configured to receive the second reference voltage and output the second indication signal.

For example, if the first signal is configured to indicate that the first voltage is greater than or equal to the first reference voltage, the first signal is at high level (logic "1"), and if the first indication signal is configured to indicate that the first reference voltage is abnormal, the first indication signal is at low level (logic "0"). Similar to the first indication signal, if the second signal is configured to indicate that the second voltage is less than or equal to the second reference voltage, the second signal is at high level (logic "1"), and if the second indication signal is configured to indicate that the second reference voltage is abnormal, the second indication signal is at low level (logic "0").

In other words, when the first indication signal is configured to indicate that the first reference voltage is abnormal, even if the first voltage is greater than or equal to the first reference voltage, it is reset to indicate that the first voltage is less than the first reference voltage, and at this time, the first indication signal may also be referred to as a reset signal (reset signal, RST). In other words, the reference voltage detection circuit 170 is not configured to output RST when the first reference voltage is not abnormal, and is configured to output RST when the first reference voltage is abnormal. Similar to the first indication signal, the reference voltage detection circuit 170 is not configured to output RST when the second reference voltage is not abnormal, and is configured to output RST when the second reference voltage is abnormal.

Here, the reference voltage generation circuit 160 may be a bandgap voltage reference (bandgap voltage reference, Bandgap) generation circuit, that is, the first reference voltage and the second reference voltage may be the bandgap voltage reference. For example, the bandgap voltage reference may be a sum of a voltage proportional to temperature and a voltage inversely proportional to the temperature, and temperature coefficients of the two cancel each other to achieve a temperature-independent reference voltage. For example, the bandgap voltage reference may be a direct current voltage that is independent from the supply and process and has a certain temperature characteristic. For example, the bandgap voltage reference may be about 1.25V.

For another example, a reference voltage of the bandgap voltage reference may be approximate to a bandgap voltage of silicon.

In some embodiments of the present application, the reference voltage generation circuit 160 is connected to an external supply (VDD), and when the reference voltage generation circuit 160 is able to provide accurate first reference voltage and second reference voltage to the at least one hysteresis comparator based on the external supply (VDD), then the first indication signal and the second indication signal are both at high level (logic "1").

When the reference voltage generation circuit 160 works abnormally, that is, the external supply VDD is too high or too low so that the first reference voltage or the second reference voltage provided by the reference voltage generation circuit 160 is no longer accurate, at this time, the first indication signal or the second indication signal is at low level (logic "0"), that is, the first signal or the second signal is output low level (logic "0"), that is, no alarm signal is sent out, which is equivalent to cause the alarm signal output by the hysteresis comparator to be invalidated, so as to avoid false alarm.

Through the reference voltage detection circuit 170, false alarm caused by the abnormality of the reference voltage can be avoided, so as to improve the accuracy of voltage attack alarm.

Of course, if the indication signal is configured to indicate that the first reference voltage is abnormal, the first indication signal is at high level (logic "1"), alternatively, if the second indication signal is configured to indicate that the second reference voltage is abnormal, the second indication signal is at high level (logic "1"), which is equivalent to that the first indication signal can be configured to alarm the power domain where the first reference voltage is located is under high voltage attack, and the second indication signal can be configured to alarm the power domain where the second reference voltage is located is under voltage attack. In other words, the reference voltage detection circuit 170 can not only indicate whether the at least one internal supply is under attack, but whether the power domain where the first reference voltage or the second reference voltage is located is under attack, so as to remind the user to pay attention to safety protection or take security measures when at least one internal supply is under attack or other power domain is under attack.

As shown in FIG. 1, in some embodiments of the present application, the voltage attack detection circuit further includes a deglitch circuit 180.

Here, the reference voltage generation circuit 160 is connected to the first AND gate 140 and the second AND gate 150 respectively through the deglitch circuit 180, and the deglitch circuit 180 is configured to reset an indication signal, configured to indicate that a reference signal is abnormal, with a duration less than or equal to a preset threshold to an indication signal configured to indicate that a reference signal is not abnormal.

For example, the deglitch circuit 180 may be configured to reset a first indication signal, configured to indicate that a first reference signal is abnormal, with a duration less than or equal to the preset threshold to the first indication signal configured to indicate the first reference is not abnormal. For another example, the deglitch circuit 180 may be configured to reset the second indication signal, configured to indicate that a second reference signal is abnormal, with a duration less than or equal to the preset threshold to the second indication signal configured to indicate that the second reference signal is nor abnormal.

It should be noted that, a glitch may be a regular or irregular pulse signal or spike signal included in an input waveform in a circuit. For example, a voltage value when there is a glitch in a positive direction of the reference voltage is equal to a voltage value when there is no glitch on the reference voltage plus a voltage value of the glitch. For another example, a voltage value when there is a glitch in a negative direction of the reference voltage is equal to a voltage value when there is no glitch on the reference voltage minus the voltage value of the glitch.

In other words, as for an unstable reference voltage, it can also be considered as a voltage of a stable reference voltage plus a glitch.

In the case of a glitch in the reference voltage, the deglitch circuit 180 can ensure the accuracy of the first indication signal and the second indication signal, and accordingly, can ensure the accuracy of the third signal and the fourth signal. In other words, the deglitch circuit 180 can correctly indicate whether the supply voltage is under attack when there is a glitch in the reference voltage, so as to remind a user to pay attention to safety protection or take security measures when the supply voltage is under attack.

As shown in FIG. 1, in some embodiments of the present application, the voltage attack detection circuit further includes a first OR gate 131 and a second OR gate 132.

Here, the first OR gate 131 is configured to receive the first signal and a first test signal and output a fifth signal, the second OR gate 132 is configured to receive the second signal and the second test signal and output a sixth signal, the first test signal is configured to indicate that the first voltage is greater than or equal to the first reference voltage, and the second test signal is configured to indicate that the second voltage is less than or equal to the second reference voltage. As shown in FIG. 1, the first test signal may also be referred to as a high voltage detection signal (TEST high voltage, TEST_HL), and the second test signal may also be referred to as a low voltage detection signal (TEST low voltage, TEST_VL). The first OR gate 131 and the second OR gate 132 can be configured to form a set self-detection circuit 130, configured to test the first signal and the second signal output by the voltage detection circuit 120.

In other words, if the TEST_VH is set to 1, the fifth signal is also forced to be set to 1; if the TEST_VL is set to 1, the sixth signal is also forced to be set to 1, so as to facilitate the functionality and integrity debugging of the system.

It should be noted that the OR gate (OR gate) is also referred to as an "OR" circuit, and a logic "OR" circuit. Specifically, if one of several conditions is met, an event will occur. This relationship is called an "OR" logic relationship, and accordingly, a circuit with an "OR" logic relationship is referred to as an OR gate. For example, the OR gate may have a plurality of input terminals and one output terminal. As long as one of the input terminals receives a high level signal (logic "1"), a signal output at the output terminal is at high level (logic "1"). Only when all the signals received by the input terminals are at low level (logic "0"), the signal output from the output terminal is at low level (logic "0"). In an embodiment of the present application, when one of the first signal and the first test signal is at high level (logic "1"), the fifth signal is at high level (logic "1"). Similarly, when one of the second signal and the second test signal is at high level (logic "1"), the sixth signal is at high level (logic "1").

Through the first test signal and the second test signal, the fifth signal may be forced to indicate that the first voltage is greater than or equal to the reference voltage, or the sixth signal may be forced to indicate that the second voltage is less than or equal to the reference voltage, so as to facilitate a designer to detect the voltage attack detection circuit.

In other words, through the first OR gate 131 and the second OR gate 132, the fifth signal and the sixth signal may be forced to enter an alarming state, respectively.

As shown in FIG. 1, in some embodiments of the present application, the voltage attack detection circuit further includes a first resistor 111. Where the first programmable resistor 112 is connected to the supply voltage through the first resistor 111.

In other words, the detection threshold generation circuit 110 may include the first resistor 111.

The present application is further provided with a chip, including a power management unit, and the power management unit is connected to the voltage attack detection circuit described above, and the voltage attack detection circuit is configured to detect whether a supply voltage of the power management unit is under voltage attack.

In other words, the voltage attack detection circuit can be applied to any chip with a power management unit. For example, a security chip. For example, the security chip may be a fingerprint sensor chip or a processor chip, etc. The security chip is applicable for any kind of electronic device. For example, portable or mobile computing devices such as smart-phones, laptops, tablets and game devices, and other electronic devices such as electronic databases, automobiles and bank automated teller machines (Automated Teller Machine, ATM).

Those of ordinary skill in the art may be aware that, units and algorithm steps of the examples described in the embodiments disclosed herein may be implemented by an electronic hardware, or a combination of computer software and computer software. Whether the functions are executed by hardware or software depends on particular applications and design constraints of the technical solutions. Those skilled may implement the described functions by using different methods for each specific application, but this implementation should not be considered to be beyond the scope of the present application.

Those skilled in the art to which the present disclosure pertains may clearly understand that, for convenience and simplicity of description, the specific working processes of the system, the apparatus and the units described above may refer to corresponding processes in the foregoing method embodiments, and will not be repeated redundantly herein.

In the several embodiments provided in the present disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. From another point of view, the displayed or discussed mutual coupling or direct coupling or communication connection may be indirect coupling or communication connection via some interfaces, devices or units, and may be in electrical, mechanical or other forms.

The units described as separate parts may be or may not be separated physically, and a component displayed as a unit may be or may not be a physical unit, namely, may be located in one place, or may be distributed on a plurality of network units. Part of or all of the units here may be selected according to a practical need to achieve the objectives of the solutions of the embodiments of the present application.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such understanding, the technical solution of the present application substantially, or the part of the present application making contribution to the prior art, or a part of the technical solution may be embodied in the form of a software product, and the computer software product is stored in a storage medium, which includes multiple instructions enabling computer equipment (which may be a personal computer, a server, network equipment or the like) to execute all of or part of the steps in the methods of the embodiments of the present application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present disclosure shall be subject to the protection scope of the claims.

What is claimed is:

1. A voltage attack detection circuit, comprising:
a first programmable resistor and a second programmable resistor, wherein a first terminal of the first programmable resistor is connected to a supply voltage, a second terminal of the first programmable resistor is connected to a ground voltage through the second programmable resistor, the first terminal is configured to output a first voltage, and the second terminal is configured to output a second voltage; and
a voltage detection circuit, wherein the voltage detection circuit is configured to receive the first voltage and a first reference voltage and output a first signal, and the first signal is configured to indicate whether the first voltage is greater than or equal to the first reference voltage, the voltage detection circuit is further configured to receive the second voltage and a second reference voltage and output a second signal, the second signal is configured to indicate whether the second voltage is less than or equal to the second reference voltage, and the first reference voltage is greater than the second reference voltage;
wherein the first reference voltage is less than or equal to a voltage value of the first voltage when the supply voltage is a maximum working voltage of a bandgap voltage reference, and the second reference voltage is greater than or equal to a voltage value of the second voltage when the supply voltage is a minimum working voltage of the bandgap voltage reference;
wherein the voltage detection circuit comprises:
a first hysteresis comparator and a second hysteresis comparator;
wherein a positive input terminal of the first hysteresis comparator is connected to the first terminal to receive the first voltage, a negative input terminal of the first hysteresis comparator is connected to the first reference voltage, an output terminal of the first hysteresis comparator is configured to output the first signal, a positive input of the second hysteresis comparator is connected to the second terminal to receive the second voltage, a negative input terminal of the second hysteresis comparator is connected to the second reference voltage, and an output terminal of the second hysteresis comparator is configured to output the second signal;

wherein the second signal is configured to indicate whether the second voltage in a falling phase is less than or equal to the second reference voltage, the second voltage is further configured to indicate whether the second voltage in a rising phase is greater than or equal to a second threshold, and a difference between the second threshold and the second reference voltage is an amount of hysteresis of the second hysteresis comparator;

wherein the voltage attack detection circuit further comprises:

a first AND gate and a second AND gate;

wherein the first AND gate is configured to receive the first signal and a first indication signal and output a third signal, the second AND gate is configured to receive the second signal and a second indication signal and output a fourth signal, the first indication signal is configured to indicate whether the first reference voltage is abnormal, and the second indication signal is configured to indicate whether the second reference voltage is abnormal;

wherein the voltage attack detection circuit further comprises:

a reference voltage generation circuit and a reference voltage detection circuit;

wherein the reference voltage generation circuit is configured to generate the first reference voltage and the second reference voltage, the reference voltage detection circuit is connected to the reference voltage generation circuit, the reference voltage detection circuit is configured to receive the first reference voltage and output the first indication signal, and the reference voltage detection circuit is further configured to receive the second reference voltage and output the second indication signal;

wherein the voltage attack detection circuit further comprises:

a deglitch circuit;

wherein the reference voltage generation circuit is connected to the first AND gate and the second AND gate respectively through the deglitch circuit, and the deglitch circuit is configured to reset an indication signal, configured to indicate that a reference voltage is abnormal, with a duration less than or equal to a preset threshold to an indication signal configured to indicate that a reference voltage is not abnormal.

2. The voltage attack detection circuit according to claim 1, wherein the first signal is configured to indicate whether the first voltage in a rising phase is greater than or equal to the first reference voltage, the first signal is further configured to indicate whether the first voltage in a falling phase is less than or equal to a first threshold, and a difference between the first reference voltage and the first threshold is an amount of hysteresis of the first hysteresis comparator.

3. The voltage attack detection circuit according to claim 1, wherein the voltage detection circuit comprises:

a first hysteresis comparator and a second hysteresis comparator;

wherein a positive input terminal of the first hysteresis comparator is connected to the first terminal to receive the first voltage, a negative input terminal of the first hysteresis comparator is connected to the first reference voltage, an output terminal of the first hysteresis comparator is configured to output the first signal, a positive input of the second hysteresis comparator is connected to the second terminal to receive the second voltage, a negative input terminal of the second hysteresis comparator is connected to the second reference voltage, and an output terminal of the second hysteresis comparator is configured to output the second signal.

4. The voltage attack detection circuit according to claim 1, wherein the voltage attack detection circuit further comprises:

a first AND gate and a second AND gate;

wherein the first AND gate is configured to receive the first signal and a first indication signal and output a third signal, the second AND gate is configured to receive the second signal and a second indication signal and output a fourth signal, the first indication signal is configured to indicate whether the first reference voltage is abnormal, and the second indication signal is configured to indicate whether the second reference voltage is abnormal.

5. The voltage attack detection circuit according to claim 4, wherein the voltage attack detection circuit further comprises:

a first OR gate and a second OR gate;

wherein the first OR gate is configured to receive the first signal and a first test signal and output a fifth signal, the second OR gate is configured to receive the second signal and a second test signal and output a sixth signal, the first test signal is configured to indicate that the first voltage is greater than or equal to the first reference voltage, and the second test signal is configured to indicate that the second voltage is less than or equal to the second reference voltage.

6. The voltage attack detection circuit according to claim 1, wherein the voltage attack detection circuit further comprises:

a first OR gate and a second OR gate;

wherein the first OR gate is configured to receive the first signal and a first test signal and output a fifth signal, the second OR gate is configured to receive the second signal and a second test signal and output a sixth signal, the first test signal is configured to indicate that the first voltage is greater than or equal to the first reference voltage, and the second test signal is configured to indicate that the second voltage is less than or equal to the second reference voltage.

7. The voltage attack detection circuit according to claim 6, wherein the voltage attack detection circuit further comprises:

a first resistor;

wherein the first programmable resistor is connected to the supply voltage through the first resistor.

8. A chip, comprising:

a power management unit, and a voltage attack detection circuit, comprising:

a first programmable resistor and a second programmable resistor, wherein a first terminal of the first programmable resistor is connected to a supply voltage, a second terminal of the first programmable resistor is connected to a ground voltage through the second programmable resistor, the first terminal is configured to output a first voltage, and the second terminal is configured to output a second voltage; and a voltage detection circuit, wherein the voltage detection circuit is configured to receive the first voltage and a first reference voltage and output a first signal, and the first signal is configured to indicate whether the first voltage is greater than or equal to the first reference voltage, the voltage detection circuit is further configured to receive the second voltage and a second reference voltage and output a second signal, the second signal is configured to indicate whether the second voltage is less than or equal to the second reference voltage, and the first reference voltage is greater than the second reference voltage;

wherein the power management unit is connected to the voltage attack detection circuit, and the voltage attack detection circuit is configured to detect whether a supply voltage of the power management unit is under voltage attack;

wherein the first reference voltage is less than or equal to a voltage value of the first voltage when the supply voltage is a maximum working voltage of a bandgap voltage reference, and the second reference voltage is greater than or equal to a voltage value of the second voltage when the supply voltage is a minimum working voltage of the bandgap voltage reference;

wherein the voltage detection circuit comprises:
a first hysteresis comparator and a second hysteresis comparator;
wherein a positive input terminal of the first hysteresis comparator is connected to the first terminal to receive the first voltage, a negative input terminal of the first hysteresis comparator is connected to the first reference voltage, an output terminal of the first hysteresis comparator is configured to output the first signal, a positive input of the second hysteresis comparator is connected to the second terminal to receive the second voltage, a negative input terminal of the second hysteresis comparator is connected to the second reference voltage, and an output terminal of the second hysteresis comparator is configured to output the second signal;

wherein the second signal is configured to indicate whether the second voltage in a falling phase is less than or equal to the second reference voltage, the second voltage is further configured to indicate whether the second voltage in a rising phase is greater than or equal to a second threshold, and a difference between the second threshold and the second reference voltage is an amount of hysteresis of the second hysteresis comparator;

wherein the voltage attack detection circuit further comprises:
a first AND gate and a second AND gate;
wherein the first AND gate is configured to receive the first signal and a first indication signal and output a third signal, the second AND gate is configured to receive the second signal and a second indication signal and output a fourth signal, the first indication signal is configured to indicate whether the first reference voltage is abnormal, and the second indication signal is configured to indicate whether the second reference voltage is abnormal;

wherein the voltage attack detection circuit further comprises:
a reference voltage generation circuit and a reference voltage detection circuit;
wherein the reference voltage generation circuit is configured to generate the first reference voltage and the second reference voltage, the reference voltage detection circuit is connected to the reference voltage generation circuit, the reference voltage detection circuit is configured to receive the first reference voltage and output the first indication signal, and the reference voltage detection circuit is further configured to receive the second reference voltage and output the second indication signal;

wherein the voltage attack detection circuit further comprises:
a deglitch circuit;
wherein the reference voltage generation circuit is connected to the first AND gate and the second AND gate respectively through the deglitch circuit, and the deglitch circuit is configured to reset an indication signal, configured to indicate that a reference voltage is abnormal, with a duration less than or equal to a preset threshold to an indication signal configured to indicate that a reference voltage is not abnormal.

9. The chip according to claim 8, wherein the first signal is configured to indicate whether the first voltage in a rising phase is greater than or equal to the first reference voltage, the first signal is further configured to indicate whether the first voltage in a falling phase is less than or equal to a first threshold, and a difference between the first reference voltage and the first threshold is an amount of hysteresis of the first hysteresis comparator.

* * * * *